United States Patent [19]

Purnell

[11] Patent Number: 5,367,984
[45] Date of Patent: Nov. 29, 1994

[54] PET LITTER BOX

[76] Inventor: Peter F. Purnell, 7 Deer La., Ledyard, Conn. 06339

[21] Appl. No.: 157,631

[22] Filed: Nov. 23, 1993

[51] Int. Cl.⁵ .................................................. A01K 1/01
[52] U.S. Cl. ...................................... 119/166; 119/165
[58] Field of Search ............... 119/161, 165, 166, 167, 119/170

[56] References Cited

U.S. PATENT DOCUMENTS

| | | |
|---|---|---|
| 2,971,493 | 2/1961 | Robb . |
| 3,476,083 | 11/1969 | Vander Wall . |
| 3,809,013 | 5/1974 | Rigney et al. . |
| 4,217,857 | 8/1980 | Geddie . |
| 4,312,295 | 1/1982 | Harrington . |
| 4,444,148 | 4/1984 | Lander . |
| 4,505,226 | 3/1985 | Carlson .............................. 119/166 |
| 4,517,920 | 5/1985 | Yamamoto . |
| 4,602,593 | 7/1986 | Gross . |
| 4,615,300 | 10/1986 | McDonough . |
| 4,616,598 | 10/1986 | Burniski et al. . |
| 4,646,684 | 3/1987 | Embry . |
| 4,649,578 | 3/1987 | Vargo ................................. 449/119 |
| 4,696,257 | 9/1987 | Neary et al. . |
| 4,723,510 | 2/1988 | Skillestad . |
| 4,771,731 | 9/1988 | Derx et al. . |
| 5,193,488 | 3/1993 | Walton ............................... 119/166 |
| 5,211,133 | 5/1993 | Foley ................................. 119/166 |

Primary Examiner—John G. Weiss
Attorney, Agent, or Firm—Joseph F. McLellan

[57] ABSTRACT

A pet litter box made of relatively light weight, easily cleaned material which includes a bottom pan for collecting liquid waste, an upper box which closely interfits with the bottom pan to contain odors in the bottom pan, and a litter tray which is supported by the upper box. The litter tray includes an apertured flat sheet which supports a layer of litter. The litter acts as a liquid waste absorber and odor barrier, while allowing unabsorbed liquid waste to pass downwardly into the bottom pan. The apertured flat sheet is integral with a cellular structure to provide structural rigidity for supporting the weight of a pet without significant downward bowing of the sheet.

6 Claims, 1 Drawing Sheet

PET LITTER BOX

BACKGROUND OF THE INVENTION

1. Field of the Invention

The present invention relates to a pet litter box comprised of relatively light weight, easily cleaned components which inter fit to internally entrap odors from unabsorbed liquid waste, and which are characterized by sufficient structural rigidity to support the weight of a pet.

2. Description Of The Prior Art

Many household pets are trained to use pet litter boxes containing a commercial litter material that can be pawed by the pet to cover solid waste material. The litter also absorbs liquid waste material up to its absorbent capacity, beyond which point the litter has to be replaced to prevent odor problems.

The useful service life of the litter can be extended by providing openings in the litter support tray and allowing localized unabsorbed liquid waste material to pass through the tray into a lower pan for periodic emptying.

Some prior litter box designs, such as that disclosed in U.S. Pat. Nos. 3,476,083 and 4,696,257, aerate the liquid waste material in the collecting pan. The litter box of the '083 patent accomplishes this by providing a pan larger than the structure it supports so that openings to atmosphere are formed between them. The '257 structure is aerated by providing holes in the sides of the collecting pan. Such aeration was apparently considered to be desirable to reduce the volume of collected liquid waste material, but this also presents the problem of undesirable odors.

The litter box of U.S. Pat. No. 4,771,731 does not provide for aeration, closely nesting the upper and lower pans to isolate the odor of the liquid waste that collects in the lower pan. However, it requires placement in the lower pan of a relatively expensive disposable deodorant containing bag. The disclosure thus teaches away from the use of a lower pan that can collect waste for periodic emptying, instead depending upon the use of a bag that itself has to be periodically replaced along with the litter.

U.S. Pat. No. 2,971,493 discloses an arrangement of upper and lower pans similar to that of the '731 patent, but screening is used in the upper pan to bear the weight of the litter and the pet. Screening is specified in order to catch the claws of the pet and discourage energetic pawing and scattering of litter. However, screening is not structurally rigid and tends to bow under any significant weight. To keep the litter on the bowed screen out of contact with the collected liquid waste below would require that the height of the liquid waste compartment be increased. This would undesirably increase the overall height of the litter box and thereby increase its tendency to tip over.

SUMMARY OF THE INVENTION

The present pet litter box is a compact, relatively light weight structure made of easily cleaned material such as thin plastic sheet material, or plastic material that is injection molded or the like to provide components having a thin cross section. This results in a relatively inexpensive litter box that can be easily handled and transported.

The litter box is constituted of a peripherally continuous bottom pan which supports a similarly peripherally continuous upper box. The peripheries are complemental such that the two can removably fit together in a way that substantially prevents odors from escaping past the interengaged portions of the bottom pan and upper box.

The upper box supports a litter tray characterized by a thin support sheet which in turn supports a layer of commercially available pet litter. The support sheet has apertures dimensioned to allow liquid waste to percolate to the bottom pan, while blocking downward passage of any litter.

The support sheet is sufficiently thin that it would bow downwardly under any significant weight, such as the weight of a pet. However, it includes a plurality of generally vertically oriented cell walls that define cells which empty into the bottom pan, the cell walls being interconnected to rigidify the composite structure against bending.

Other objects and features of the present invention will become apparent from the following more detailed description taken in conjunction with the accompanying drawings.

DESCRIPTION OF THE PREFERRED EMBODIMENT

Figure 1:
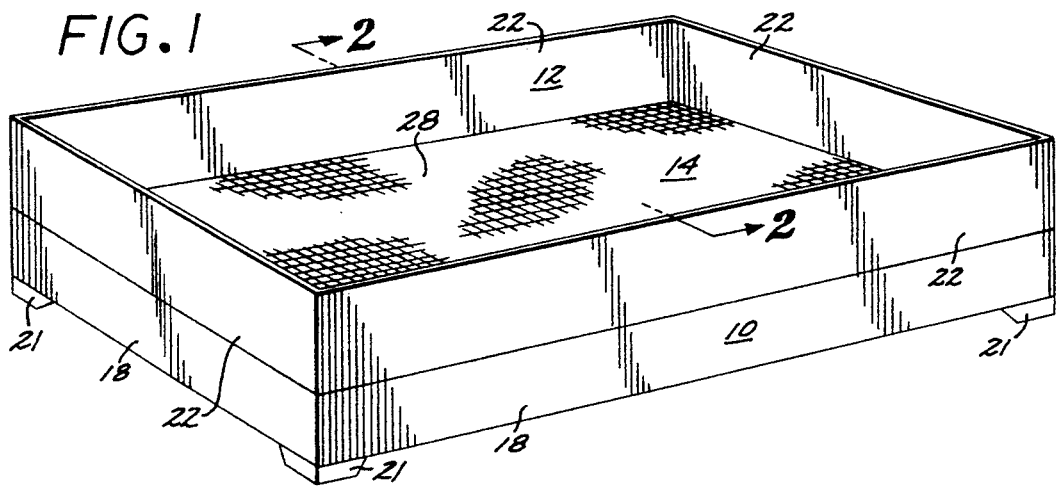
FIG. 1 is a perspective view of the pet litter box of the present invention, the commercially available litter being omitted for clarity.
Figure 2:
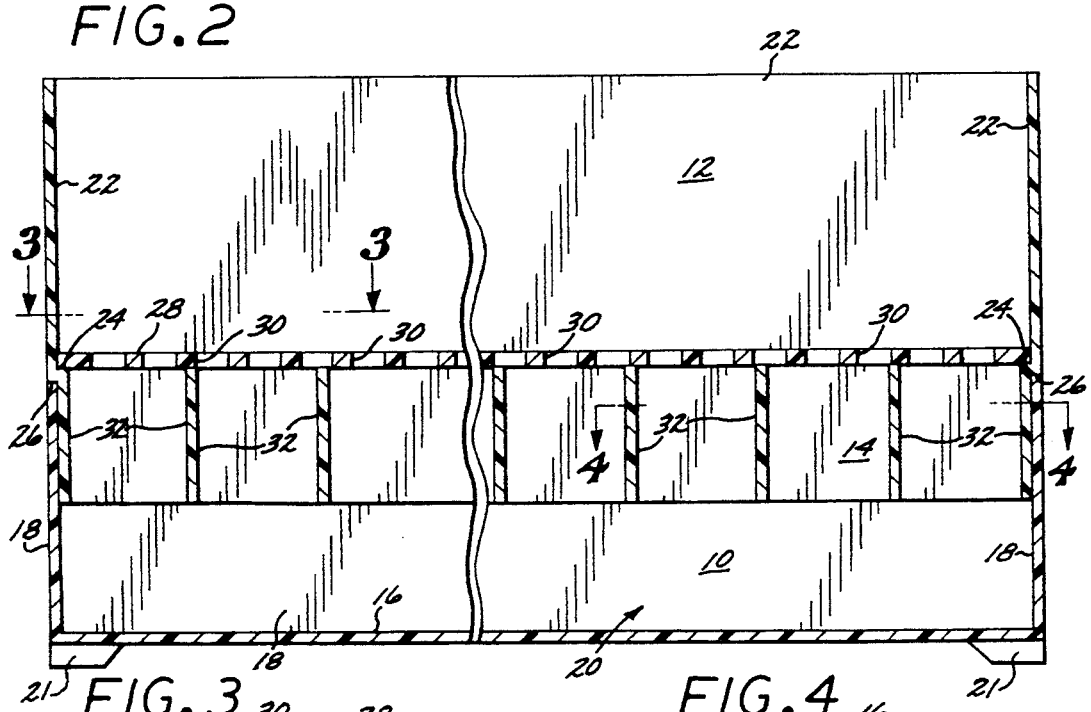
FIG. 2 is a view taken along the line 2—2 of FIG. 1, the showing being foreshortened in a transverse direction to conserve drawing space.
Figure 3:
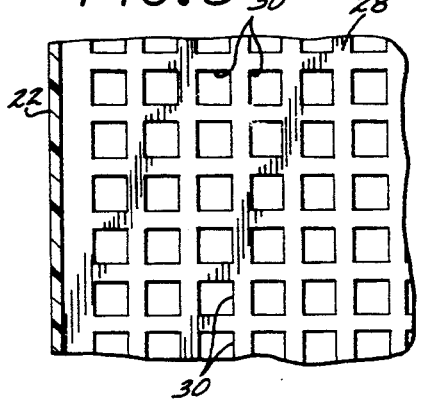
FIG. 3 is a view taken along the line 3—3 of FIG. 2.

Referring now to the drawings, there is illustrated a pet litter box according to the present invention which comprises, generally, a bottom pan 10 supporting an upper box 12 which in turn supports a litter tray 14.

These components are made of lightweight plastic material that is fabricated in any suitable manner, but preferably is injection molded. An object of the invention is to provide a very light weight, inexpensive, readily transportable, and easily cleaned assembly. There are many plastic materials known to those skilled in the trade which satisfy these requirements, and a discussion of their relative merits is omitted for brevity.

· Minimizing the amount of plastic material used not only reduces weight, but reduces costs as well. Thus, the litter box is formed of thin interconnected flat sections of plastic material, some of the sections being integrally rigidified by suitable reinforcing structure, as will be seen.

The bottom pan 10 includes a flat bottom 16 of rectangular shape, and integral end and side pan walls 18 which are generally vertically oriented and. peripherally continuous. The bottom 16 and pan walls 18 define a collection chamber 20 for collecting liquid waste. If desired, the four corners of the pan 10 may be provided with supporting legs 21.

The upper box 12 defines a pet use area for admitting a pet. It includes generally vertically oriented, peripherally continuous end and side box walls 22 having lower extremities configured to closely and removably engage the upper extremities of the pan walls 18 in close fitting relation. The removability of the upper box 12 is important to gain access to the pan 10 so that it can periodically be emptied.

The lower extremities of the box walls 22 are inwardly offset relative to the upper extremities of the pan walls 18 in an amount approximating the thickness of the upper extremities of the pan walls 18. This forms a peripherally continuous shoulder or offset having a generally horizontal upper side or seat 24 and a generally horizontal lower side or seat 26.

With this arrangement the lower seat 26 is adapted to removably rest upon the upper margins of the pan walls 18, with the upper extremities of the pan walls in close fitting, slidable engagement with the inwardly offset lower extremities of the box walls 22.

The upper box 12 is thus supported upon the bottom pan in a manner which substantially prevents the escape of odors from the collection chamber 20 past the engaged extremities of the pan walls 18 and the box walls 22.

The litter tray 14 includes a generally rectangular Hat support sheet 28 which is supported at its periphery within the pet use area by removably resting upon the upper seat 24 of the box walls 22.

The sheet 28 is provided with a plurality of openings or apertures 30 which may be formed in the sheet 28 in any suitable pattern or spacing by any suitable ;means. In the embodiment illustrated, the apertures are formed by injection molding the sheet 28 in a rectangular grid pattern.

The sheet 28 supports a layer of any suitable, commercially available pet litter (not shown) that is adapted to absorb liquid waste. It preferably includes a deodorant. The litter is usually in small individual pieces or chunks so that a pet can paw the litter to cover solid waste material. The size of the apertures 30 is therefore selected to prevent the individual pieces of litter from dropping though to the collection chamber 20, while permitting unabsorbed liquid waste to percolate through the bed of litter and the apertures 30 to the collection chamber. This extends the service life of the litter, and collects the liquid waste in the collection chamber 20 where its odor can be substantially trapped by the overlying layer of litter.

The sheet 28 is made thin in section to reduce its weight and to minimize the amount of molding plastic needed to fabricate it. Consequently, the sheet 28 by itself will deform or bow downwardly under the weight of a pet using the litter. This would undesirably allow the layer of litter to come into contact with the collected liquid waste in the chamber 20. Rather than increase the height of the bottom pan 10 to achieve a deeper chamber, the sheet 28 is provided with a plurality of generally vertically oriented cell walls 28 which are either integrally molded to the sheet, as illustrated, or are fabricated separately and later secured to the sheet by adhesives or otherwise.

Figure 4:
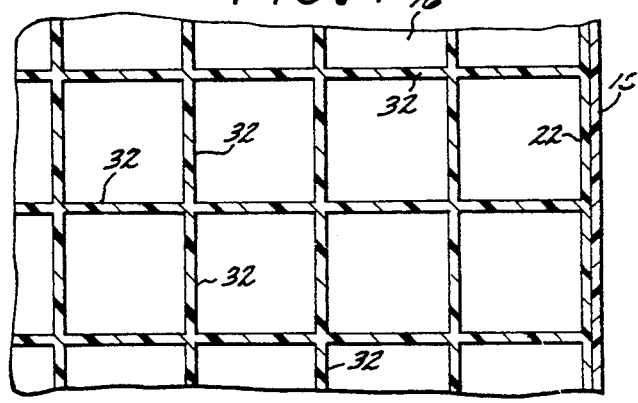
FIG. 4 is a view taken along the line 4—4 of FIG. 2.

The cell walls 28 define a plurality of rectangular cells, as best seen in FIG. 4, whose upper extremities are preferably molded integral with the sheet 28. The lower extremities of the cells open into and terminate above the liquid waste in the chamber 20.

The cell walls 28 are preferably interconnected, in the exemplary rectangular grid pattern illustrated, to rigidify the sheet 28 and prevent it from bowing under the weight of the litter and any pet on the litter tray. If desired, the cells could be any of many configurations, round, hexagonal, etc.

In summary, the present pet litter box is seen to be relatively inexpensive, light in weight, readily transportable and easily cleaned, and characterized by rigidifying structure which provides adequate strength despite the thin cross section of the components of the litter box.

Various modifications and changes may be made with regard to the foregoing detailed description without departing from the spirit and scope of the invention.

What is claimed is:

1. A pet litter box comprising:
   a bottom pan defining a collection chamber for liquid waste, the bottom pan being otherwise sealed off from the outside;
   an upper box defining a pet use area for admitting a pet, and characterized by generally vertically oriented, peripherally continuous box walls having lower extremities complementally configured to closely and removably engage the upper extremities of the pan walls in close fitting relation for supporting the upper box on the bottom pan while substantially preventing escape of odors from the collection chamber pas the engaged extremities of the pan walls and the box walls; and
   a litter tray including a support sheet having a flat upper surface, the litter tray being fitted within the pet use area, supported at its periphery by the box walls in overlying relation to the upper opening in the bottom pan, and adapted to support litter, the support sheet having apertures in the flat upper surface dimensioned to allow downward passage of liquid waste, to prevent downward passage of litter, and to enable the litter to act as an odor barrier to prevent upward passage of odors, the litter tray further including a plurality of generally vertically oriented cell walls secured at their upper extremities to the support sheet and defining a plurality of relatively thin wall cells opening downwardly into the collection chamber, the cell walls being interconnected to rigidify the support sheet against bowing under the weight of the litter and a pet located in the pet use area.

2. A pet litter box according to claim 1 wherein the lower extremities of the box walls are inwardly offset relative to the upper extremities of the pan walls in an amount approximating the thickness of the upper extremities to form a peripherally continuous offset having an underside and an upper side, and supporting the upper extremities on the underside and supporting the support sheet on the upper side.

3. A pet litter box according to claim 1 wherein the support sheet of the litter tray removably rests upon the box walls.

4. A pet litter box according to claim 1 wherein the cell walls are molded integrally with the support sheet.

5. A pet litter box according to claim 1 wherein the support sheet is formed in a rectangular grid pattern defining regularly spaced uniformly dimensioned apertures.

6. A pet litter box according to claim 1 wherein the cell walls are formed in a rectangular grid pattern defining vertically elongated cells having a generally square cross section.

* * * * *

UNITED STATES PATENT AND TRADEMARK OFFICE
CERTIFICATE OF CORRECTION

PATENT NO. : 5,367,984
DATED : Nov. 29, 1994
INVENTOR(S) : Peter F. Purnell

It is certified that error appears in the above-identified patent and that said Letters Patent is hereby corrected as shown below:

Column 3, line 20, delete "Hat" and insert --flat--;

Column 4, line 15, after "waste", insert --the bottom pan having an upper opening defined by the upper extremities of generally vertically oriented, peripherally continuous pan walls,--; and line 25, delete "pas" and insert --past--.

Signed and Sealed this

Twenty-fourth Day of January, 1995

Attest:

BRUCE LEHMAN

*Attesting Officer*  *Commissioner of Patents and Trademarks*